United States Patent [19]
Maeda et al.

[11] Patent Number: 5,093,820
[45] Date of Patent: Mar. 3, 1992

[54] OPTICAL DISK RECORDING/REPRODUCING DEVICE

[75] Inventors: Shigemi Maeda, Yamatokoriyama; Hiroshi Fuji, Nara; Shigeo Terashima, Tenri; Toshihisa Deguchi, Nara, all of Japan

[73] Assignee: Sharp Kabushiki Kaisha, Osaka, Japan

[21] Appl. No.: 561,822

[22] Filed: Aug. 2, 1990

[30] Foreign Application Priority Data

Aug. 4, 1989 [JP] Japan ................................. 1-203231
Aug. 4, 1989 [JP] Japan ................................. 1-203232

[51] Int. Cl.⁵ ..................... G11B 5/09; G11B 15/52; G11B 20/10; G11B 27/22
[52] U.S. Cl. .................................... 369/50; 369/189; 369/280; 358/342
[58] Field of Search ............... 369/39, 50, 53, 189, 369/240, 266, 267; 360/72.1, 72.2, 73.01, 73.03; 358/338, 342

[56] References Cited

U.S. PATENT DOCUMENTS

| 4,439,849 | 3/1984 | Nabeshima | 358/338 X |
| 4,530,083 | 7/1985 | Ishihara | 369/267 X |
| 4,757,488 | 7/1988 | Nagai | 369/50 X |
| 4,866,695 | 9/1989 | Suzuki | 369/267 X |
| 4,896,221 | 1/1990 | Mashimo | 360/73.03 X |

FOREIGN PATENT DOCUMENTS 1-39632 2/1989 Japan .

OTHER PUBLICATIONS

"Zukai Compact Disk Dokuhon" (Illustrative Compact Disk Handbook) The second edition–Apr. 25, 1988.
The English Abstract of Japanese No. 63-222379; Sony Corp. The Art of Digital Audio; John Watkinson; Jan. 1988; pp. 1 and 441 to 487.

Primary Examiner—Roy N. Envall, Jr.
Assistant Examiner—R. Chevalier

[57] ABSTRACT

An optical disk recording/reproducing device in accordance with the present invention has a controller that, during recording, performs the rotation control of the optical disk in Constant Linear Velocity according to reproduced signals of pre-recorded information that was pre-recorded on the optical disk, during reproduction, performs the rotation control according to reproduced signals of recorded information, and when the rotation control based on the reproduced signals of the recorded information is infeasible, switches the rotation control and performs the rotation control based on the reproduced signals of the pre-recorded information during reproduction also. As a result, a suitable and appropriate CLV control may be executed during recording and during reproduction.

22 Claims, 11 Drawing Sheets

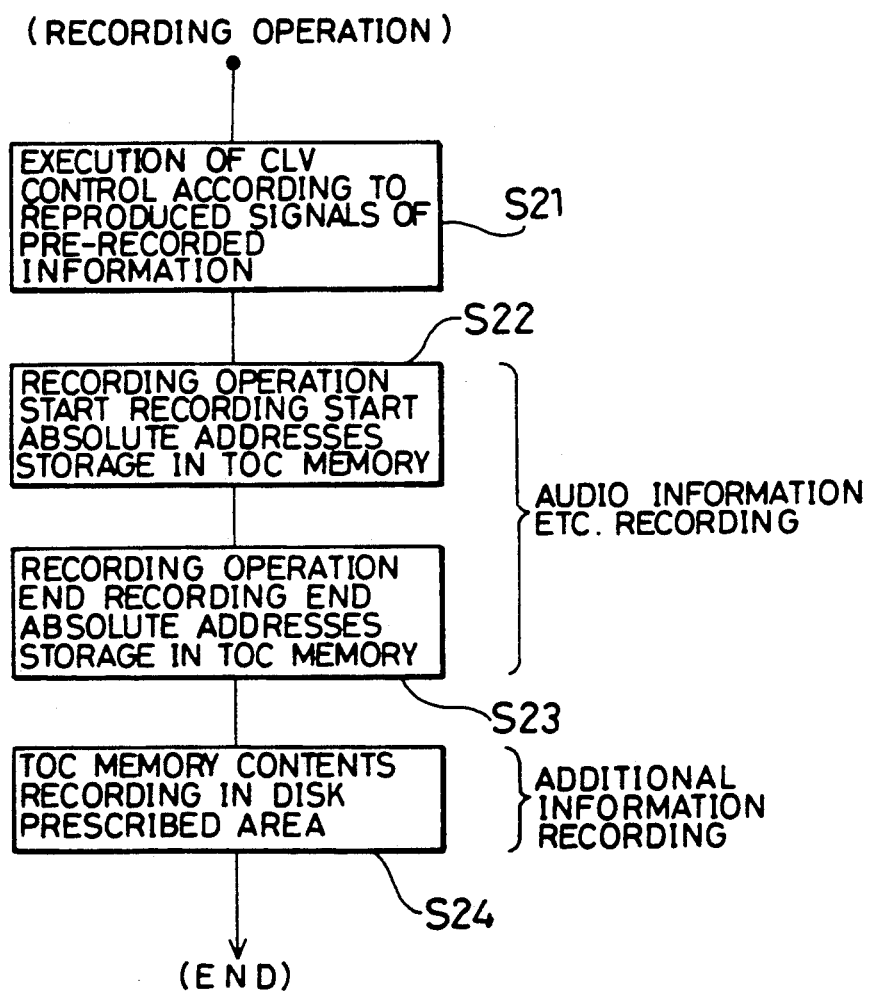

OPTICAL DISK RECORDING/REPRODUCING DEVICE

FIELD OF THE INVENTION

The present invention relates to an optical disk recording/reproducing device that records and/or reproduces information and maintains rotation of Write-Once type or Rewritable type optical disk in Constant Linear Velocity.

BACKGROUND OF THE INVENTION

In the conventional art, compact disks (herein after referred to as CDs) whereon audio information or other information is recorded in the form of digital signals through minute pits that can be detected optically, are widely used as optical disks. The information recorded on a CD is reproduced by means of a Read-Only optical disk recording/reproducing device.

In a CD, a plurality of pieces of information are usually recorded in succession. In addition, absolute addresses that provide information concerning recording/reproducing positions on the disk are pre-recorded on the disk in the form of physical alterations. During the reproduction, absolute addresses read from the disk and absolute addresses indicating the recording start position of each piece of information and recorded in a TOC (Table Of Contents) area provided in the inner periphery or other location of the disk, are compared, and the desired pieces of information may be reproduced successively or selectively.

An optical disk recording/reproducing device that records and reproduces audio information or other information on rewritable optical disks developed recently such as magneto-optical disks or Write-Once type optical disks where information can be recorded only once, should preferably adopt the same method of reproduction as the one used in a conventional optical disk recording/reproducing device for. CDs only and should be compatible with the different types of optical disks in use. In this case, a Constant Linear Velocity (hereinafter referred to CLV) that is employed with CDs may be adopted as rotation control method for the writable or write-once optical disk during recording and reproduction.

The CLV method may be implemented by, for example, controlling the rotational speed of a motor in accordance with the radial position of an optical head. In this case, the rotational speed of the motor is detected by means of a rotary encoder or other member, and the radial position of the optical head is detected by means of a position detecting sensor. However, when the CLV method is implemented in such a manner, rotation control that is sufficiently accurate cannot be expected due to errors in, the detections performed by the rotary encoder and the position detecting sensor.

The accuracy of the rotation control may be improved by enforcing the CLV method according to disk position information that was pre-recorded on the optical disk such as the absolute addresses described above. In the conventional art, Japanese Publication for Unexamined Patent Application 1989-39632 (Tokukaisho 64-39632) discloses a method for recording absolute addresses. Namely, the disk position information goes through a Biphasemark modulation process and the guiding groove of the optical disk is made to deviate inward or outward in a radial direction or the width of the guiding groove is changed, depending on whether the modulated code is "1" or "0". The absolute adresses and the recorded information can be reproduced separately by having their respective frequency bandwidths differ from each other.

However, even if the information is recorded while the optical disk is driven to rotate according to the information pre-recorded on the optical disk such as absolute addresses, etc., in practice, there is a possibility that the information might be recorded in a condition that is slightly different from the CLV requirements because of CLV control errors occurring during recording. In this case, if the information recorded is audio information, variations might occur in the speed at which music is played during the reproduction. Therefore, during the reproduction, a CLV control that is based on the information to be reproduced should be performed.

However, reproduction, errors occur frequently, and when the optical head moves from a recorded area to an unrecorded area, rotation control based on the reproduced information becomes infeasible. In addition, once the rotation control bases on the reproduction information has become infeasible, a significant lapse of time is needed before the rotation control can be executed correctly even after the quality of the reproduced signals has been restored.

SUMMARY OF THE INVENTION

An object of the present invention is to provide an optical disk recording/reproducing device where the rotation control in Constant Linear Velocity of an optical dish, may be executed based on the reproduced signals of pre-recorded information that was pre-recorded on the optical disk, during reproduction when a rotation control based on the reproduced signals of recorded information is infeasible.

In order to achieve the above object, an optical disk recording/reproducing device in accordance with the present invention is characterized as comprising control means for performing the rotation control of an optical disk in Constant Linear Velocity such that:

during recording, the rotation control is executed according to reproduced signals of pre-recorded information, that was recorded on the optical disk previously, during reproduction, the rotation control is executed according to reproduced signals of recorded information, and when the rotation control based on the reproduced signals of the recorded information is infeasible, the rotation control is switched and executed according to the reproduced signals of the pre-recorded information during reproduction also.

With the above arrangement, the rotation control in Constant Linear Velocity (CLV) is performed according to the reproduced signals of the pre-recorded information during recording, and according to the reproduced signals of the recorded information during reproduction. As a result, a suitable and appropriate CLV control may be performed during recording and reproduction.

In addition, when during reproduction, the CLV control based on the reproduced signals of the recorded information is infeasible because of frequent reproduction errors or because reproduced signals cannot be obtained because the optical head is above an unrecorded area, an altenative method is used. With this alternative method, the CLV control is switched to the CLV control based on the reproduced signals of pre-recorded information during reproduction also. Difficulties such as the infeasibility of a CLV control during the reproduction are, therefore, thus overcome.

For a more complete understanding of the nature and advantages of the invention, reference should be made to the ensuing detailed description taken in conjunction with the accompanying drawings.

BRIEF DESCRIPTION OF THE DRAWINGS

FIG. 1(a) is a flow chart illustrating a CLV control procedure during a recording.

FIG. 1(b) is a flow chart illustrating a CLV control procedure during a reproduction.

FIG. 2 is a schematic plane view illustrating a magneto-optical disk.

FIG. 3 is an enlarged partial plane view illustrating the magneto-optical disk.

FIG. 4 is a block diagram illustrating schematically the configuration of an optical disk recording/reproducing device.

FIG. 5 is an explanatory view illustrating the frame format of a signal.

FIG. 6 is a block diagram illustrating essential parts of the optical disk recording/reproducing device.

FIG. 8 to FIG. 11(e) illustrate a third embodiment.

FIG. 8 is a block diagram illustrating essential parts of an optical disk recording/reproducing device.

FIG. 9 to FIG. 11(e) are time charts respectively illustrating the variation of signals around a phase locked loop.

FIG. 15 and FIG. 16 illustrate a seventh embodiment.

FIG. 15(a) is a flow chart illustrating a CLV control procedure during a recording.

FIG. 16 is a block diagram illustrating schematically the configuration of another optical disk recording/reproducing device.

DESCRIPTION OF THE EMBODIMENTS

A first embodiment of the present invention will be described with reference to FIG. 1 to FIG. 6.

Figure 1:
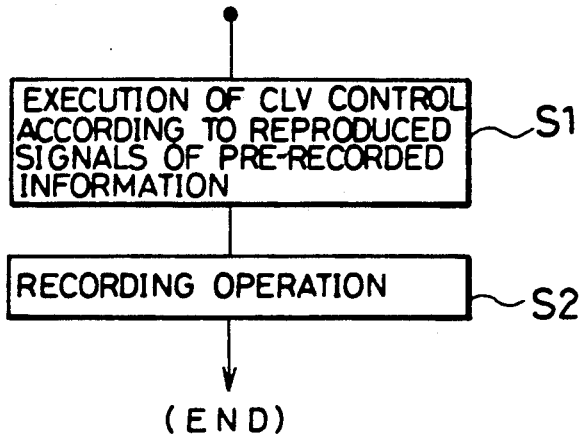
FIG. 1 to FIG. 6 illustrate a first embodiment of the present invention.
Figure 1:
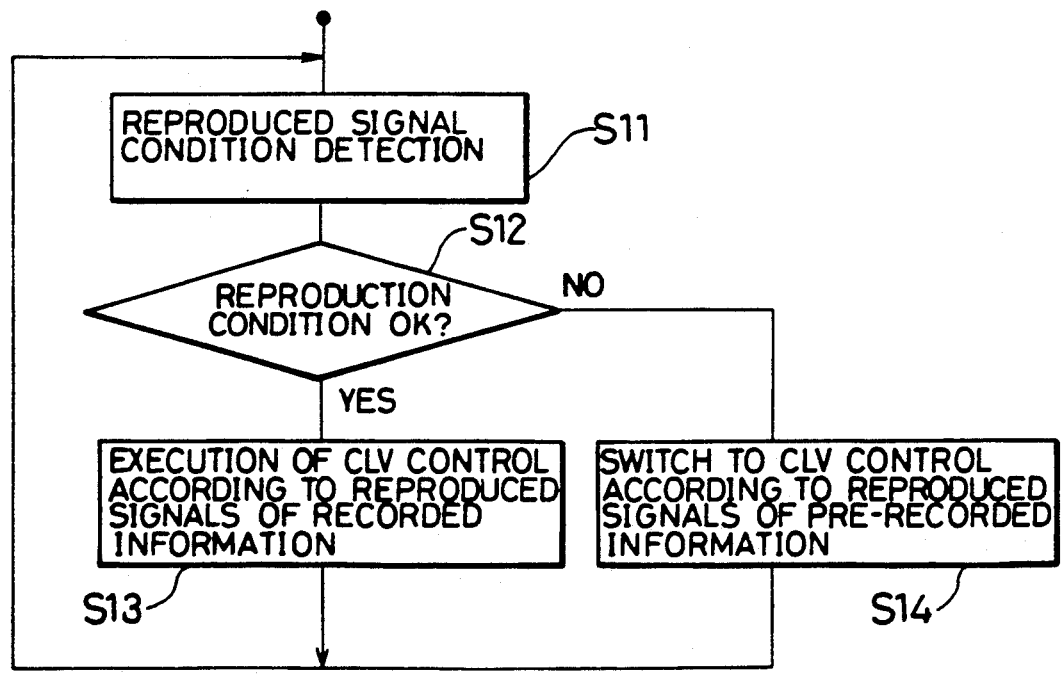
Figure 2:
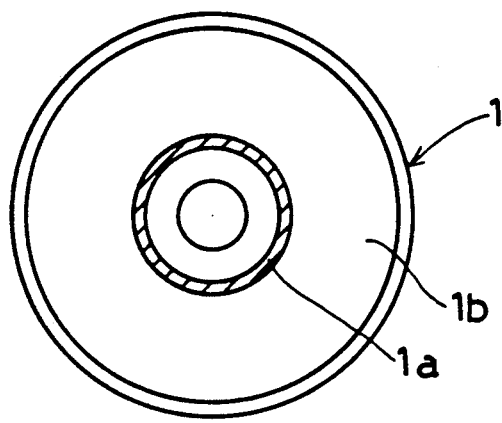

As illustrated in FIG. 2, a rewritable magneto-optical disk 1 has a TOC (Table Of Contents) area 1a located in the inner periphery, as well as an information recording area 1b occupying most of the area outside the TOC area 1a. Different types of information such as music programs or other data, are recorded in the information recording area 1b while additional information concerning the different pieces of information recorded in the information recording area 1b, is recorded in the TOC area 1a. The additional information might consist for example of absolute addresses indicating the recording start position and absolute addresses indicating the recording end position of each information.

Figure 3:
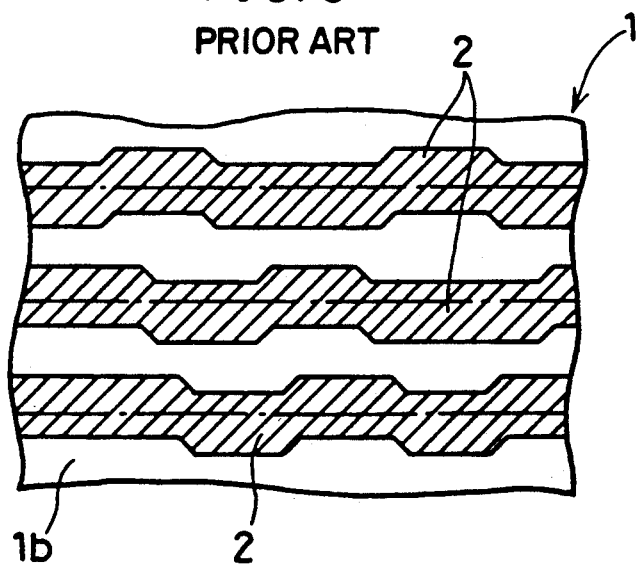

As illustrated in FIG. 3, a guiding groove 2 of a spiral shape (shown by hatching for reasons of convenience) is pre-formed in the TOC area 1a and the information recording area 1b of the magneto-optical disk 1 and circles at predetermined intervals in a radial direction. THe guiding groove 2 may also be composed of concentric circles. The guiding groove 2 is used for the tracking control during recording and reproduction. The guiding groove 2 is made to deviate inward or outward in a radial direction depending of whether the modulated codes obtained after the absolute addresses provided on the disk went through a Biphasemark modulation process, are "1" or "0". The above absolute addresses form pre-recorded information to be used as rotation control information.

Figure 4:
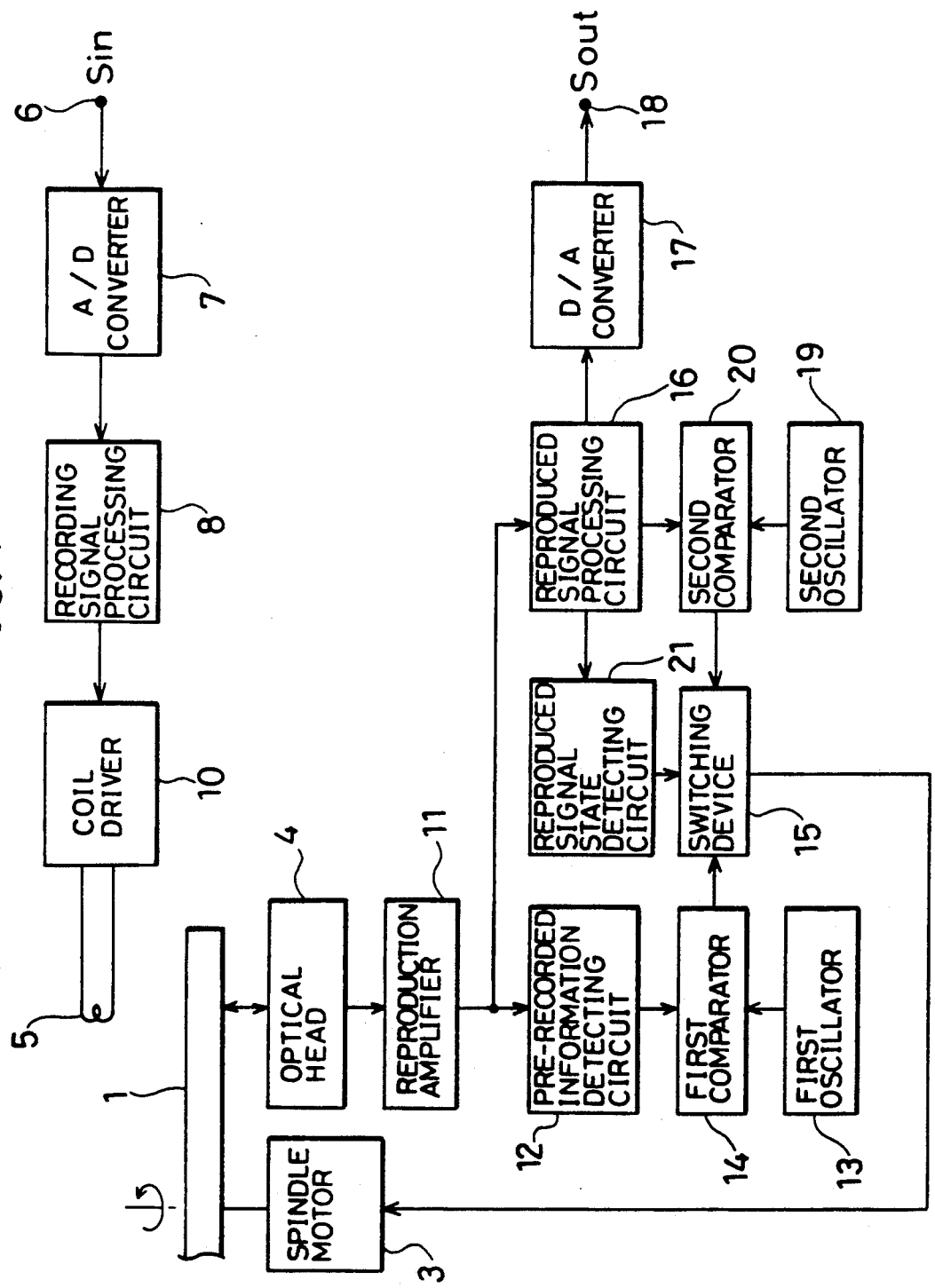

As illustrated in FIG. 4, the optical disk recording/reproducing device of the present embodiment comprises a spindle motor 3, as driving means for supporting and rotating the magneto-optical disk 1, an optical head 4 that projects a laser beam on the magneto-optical disk 1 during recording and reproduction, and a coil 5 that applies a magnetic field to the magneto-optical disk 1 during recording. The present optical disk recording/reproducing device adopts a magnetic modulation method as a method for recording information and is capable of overwriting by recording new information over information already recorded.

The optical disk recording/reproducing device includes an input terminal 6 where the information to be recorded is entered. Analog information that was entered through the input terminal 6 is converted into a digital signal in an A/D (analog/digital) converter 7, goes through a predetermined EFM (Eight to Fourteen Modulation) process in a recording signal processing circuit 8, and is fed into a coil driver 10. The signal is recorded as the coil driver 10 drives the coil 5 in response to the signal that was fed thereto, while at the same time a laser beam is projected from the optical head 4 and irradiates the magneto-optical disk 1.

Figure 5:
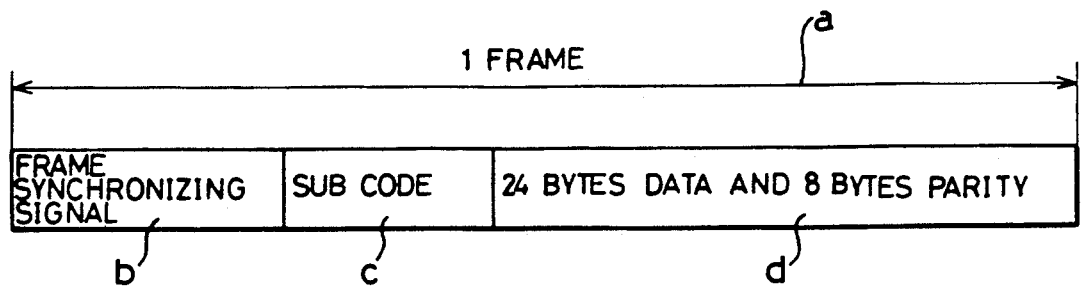

FIG. 5 shows the frame format of signals used in a CD. Information "a" of one frame is composed of a data field "d" comprising audio information or other information of 24 bytes and an error correction parity of 8 bytes added thereto, a sub code "c" indicating the number of the piece of music, the time and other information about the audio information, and a synchronizing signal "b" appended to each frame and indicating the leading edge of the frame. Pieces of information "a" of one frame are recorded in succession.

Sub codes "c" comprised in the pieces of additional information recorded in the TOC area 1a further include at least information concerning the recording end position of each information, or information indicating the recording time from the recording start position to the recording end position of each information recorded according to the above frame format.

The reproduction system of the optical disk recording/reproducing device will be described hereinbelow. As illustrated in FIG. 4, a signal that was reproduced by means of the optical head 4 is amplified by a reproduction amplifier 11. The amplified signal is sent to a pre-recorded information detecting circuit 12 and to a reproduced signal processing circuit 16.

The pre-recorded information detecting circuit 12 is, for example composed of a band-pass filter and a phase locked loop. Clock signals, synchronized with the reproduced signals of the pre-recorded information (that is, constituted by a Biphasemark modulated wave) that were extracted from the reproduced signals by means of the band-pass filter, are generated by the phase locked loop. The frequency of the clock signals and a first reference frequency supplied by a first oscillator 13 are compared in a first comparator 14 and differential signals are fed into a switching device 15. The present device further comprises a pre-recorded information demodulating section, not shown. When necessary (for instance when accessing, etc.), the Biphasemark modulated waves go through a Biphasemark demodulation process in the pre-recorded information demodulating section, thereby permitting the absolute addresses to be recognized.

Magneto-optical signals that were extracted from the reproduced signals supplied from the reproduction amplifier 11, i.e. the reproduced signals of the recorded information, go through a process for demodulating the signals that were modulated through an EFM process, and other prescribed processes in the reproduced signal processing circuit 16. After the signals pass through these reproduction processes, they are sent to a D/A (digital/analog) converter 17 and an output terminal 18.

The frame synchronizing signals described earlier in each of the frames composing the reproduced signals of the recorded information are detected by means of the reproduced signal processing circuit 16. When a synchronizing signal is detected, a synchronizing signal detection pulse is generated by the reproduced signal processing circuit 16 and sent to a second comparator 20. The frequency of the synchronizing signal detection pulse is compared with a second reference frequency supplied from a second oscillator 19 and the differential signal resulting from this comparison is sent to the switching device 15. When the same reference frequency is employed in the first oscillator 13 and the second oscillator 19, a common oscillator may be used for the first oscillator 13 and the second oscillator 19. Also, when the first and second reference frequencies of the first and second oscillators are such that one frequency is a harmonic of the other, a single oscillator may be used and the frequency of this oscillator divided appropriately by means of a divider.

The signals that were processed in the reproduced signal processing circuit 16, are sent to a reproduced signal state detecting circuit 21 serving as reproduced signal state detecting means. The signal state detecting circuit 21 determined whether the magneto-optical signals recorded on the magneto-optical disk 1 are reproduced correctly, or whether the optical head 4 is presently reproducing a recorded area or an unrecorded area. Namely, the reproduced signal state detecting circuit 21 detects the frame synchronizing signals are successively missing due to anomalies in the synchronization, or that frame synchronizing signals are successively missing because the optical head 4 is above an unrecorded area.

The optical disk recording/reproducing device further comprises control means composed of a controller and other members, not shown. As illustrated in FIG. 1(a), during recording, the control means switches the switching device 15 toward the first comparator 14 and executes the recording operation (S2) while performing the CLV control according to the reproduced signals of the pre-recorded information (S1). The CLV control is performed such that the differential signals released by the first comparator 14 are sent to the spindle motor 3 through the switching device 15 and the frequency of the clock signals released by the pre-recorded information detecting circuit 12 coincides with the first reference frequency of the first oscillator 13. The clock signals are synchronized with the Biphasemark modulated waves of the absolute addresses serving as pre-recorded information.

As illustrated in FIG. 1(b), during reproduction, the condition of the reproduced signals is detected by means of the reproduced signal state detecting circuit 21 (S11) and the control means determines whether the reproduced signals are in a suitable condition (S12). When the reproduction of a recorded area is performed and when the reproduced signals are in a suitable condition, the control means switches the switching device 15 toward the second comparator 20 and executes the reproduction operation while performing the CLV control according to the reproduced signals of the recorded information (S13). In this case, the CLV control is performed such that, the differential signals released by the second comparator 20 are fed into the spindle motor 3 through the switching device 15 and the frequency of the synchronizing signal detection pulses released from the reproduced signal processing circuit 16 coincides with the second rerference frequency of the second oscillator 19. As a result, the amount of information reproduced per time unit during the reproduction is kept constant even when slight variations occurred in the linear velocity during recording.

As described earlier, during reproduction, an alternative method is followed when the CLV control based on the reproduced signals of the recorded information is infeasible, that is when the reproduced signal state detecting circuit 21 detects that the optical head 4 entered into an unrecorded area, or that reproduction errors occur frequently and that the condition of the reproduced signals is poor. The alternative method consists in swinging to a CLV control executed based on the reproduced signals of the pre-recorded information during reproduction also (S14). Inconveniences such as the infeasability of a CLV control during the reproduction, are thus eliminated.

Figure 6:
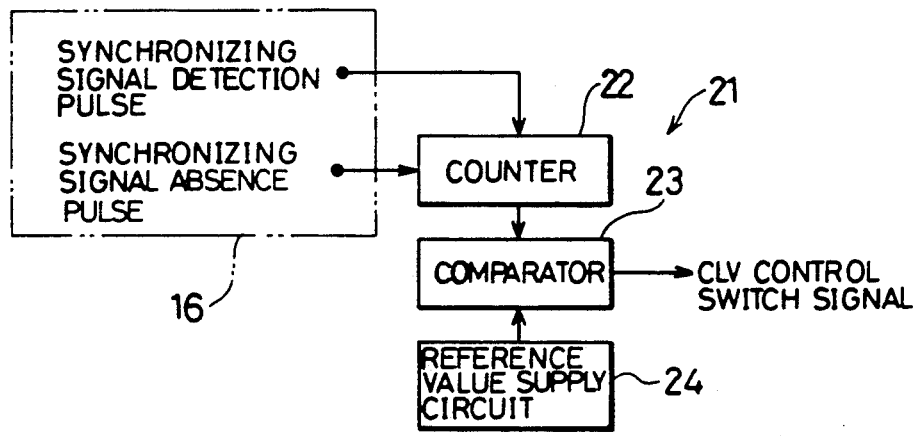

The configuration and operation of the reproduced signal state detecting circuit 21 will be described more precisely hereinbelow. As illustrated in FIG. 6, the reproduced signal state detecting circuit 21 comprises a counter 22, a comparator 23 and a reference value supply circuit 24. Synchronizing signal detection pulses, that are produced when frame synchronizing signals are detected in the reproduced signal processing circuit 16, are fed with a predetermined timing into a reset terminal of the counter 22. Meanwhile, synchronizing signal absence pulses that are produced when frame synchronizing signals are missing in the reproduced signal processing circuit 16, are fed into a clock terminal of the counter 22 with a predetermined timing. In such a manner, the number of times a synchronizing signal absence pulse is supplied is counted by the counter 22. The counter 22 is reset when a synchronizing signal detection pulse is fed thereto.

The value produced by the counter 22 is compared with a reference value supplied by the reference value supply circuit 24 in the comparator 23. When the value released by the counter 22 is greater than the reference value, (when frame synchronizing signals are continuously missing in a number exceeding a predetermined number), a synchronization anomaly has occurred in the recorded area, or the optical head 4 has entered into a unrecorded area, and therefore, frame synchronizing signals cannot be detected while the CLV control is executed according to the reproduced signals of the recorded information. A CLV control switch signal is subsequently released by the comparator 23 and is fed into the switching device 15. In such a manner, an optical disk recording/reproducing device in accordance with the present invention is designed such that during reproduction also, the CLV control can be switched from the CLV control based on the reproduced signals of the recorded information to the CLV control based on the reproduced signals of the pre-recorded information. A suitable and appropriate CLV control is thus ensured during the recording as well as during the reproduction.

A second embodiment will be described hereinafter with reference to FIG. 7. The optical disk recording/reproducing device of the second embodiment has almost the same configuration as the optical disk recording/reproducing device of the first embodiment except that it comprises a reproduced signal state detecting circuit 21 which is different from the one described in the first embodiment. To simplify, only the detailed configuration of another example of reproduced signal state detecting circuit 21 will be discussed hereinbelow. In this embodiment too, provision is made such that during the reproduction, the reproduced signal state detecting circuit 21 switches to the CLV control executed based on the reproduced signals of the pre-recorded information when reproduction errors occur continuously in the recorded area of the information recording area 1b.

Figure 7:
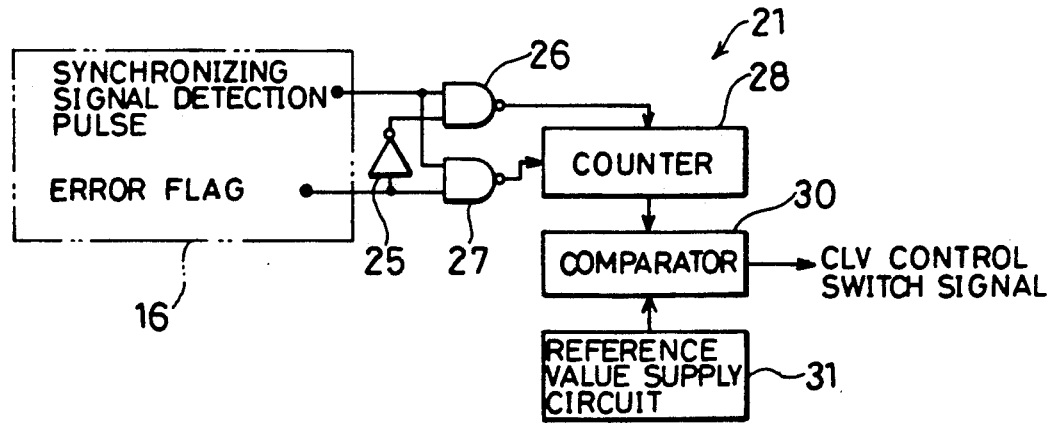
FIG. 7 is a block diagram illustrating essential parts of an optical recording/reproducing device of a second embodiment.

As illustrated in FIG. 7, the reproduced signal state detecting circuit 21 comprises an inverter 25, two NAND circuits 26 and 27, a counter 28, a comparator 30 and a reference value supply circuit 31. The above-mentioned synchronizing signal detection pulses are supplied from the reproduced signal processing circuit 16 to an input terminal of the NAND circuit 26 and an input terminal of the NAND circuit 27. An error flag indicating whether or not reproduction errors occurred within the frames of the reproduced signals, is produced by the reproduced signal processing circuit 16 and fed into the other input terminal of the NAND circuit 26 through an inverter 25. The error flag is fed directly into the other input terminal of the NAND circuit 27. When a reproduction error occurred, the error flag released by the reproduced signal processing circuit 16 is in the high level. On the other hand when there is no reproducing error, the error flag released by the reproduced signal processing circuit 16 is in the low level.

Accordingly, when a reproduction error occurred in a certain frame and the error flag changes to the high level, the value of the counter 28 is increased in response to a signal released by the NAND circuit 27 and fed into the clock terminal of the counter 28. When there is no reproduction error in a certain frame and the error flag changes to the low level, the counter 28 is reset in response to a signal released by the NAND circuit 21 and fed into the reset terminal of the counter 28. The value of the counter 28 is compared with the reference value of the reference value supply circuit 31 in the comparator 30. When the value of the counter 28 is greater than the reference value, (when reproduction errors occurred continuously in a number of frames exceeding a prescribed number,) reproduction errors have occurred and the condition of the reproduced signals is poor. A CLV control switch signal is subsequently released by the comparator 30 and is fed into the switching device 15. As a result, the CLV control is executed according to the reproduced signals of the pre-recorded information during the reproduction also.

Another embodiment of the reproduced signal state detecting circuit 21 will be described with reference to FIG. 8 to FIG. 11.

Figure 8:
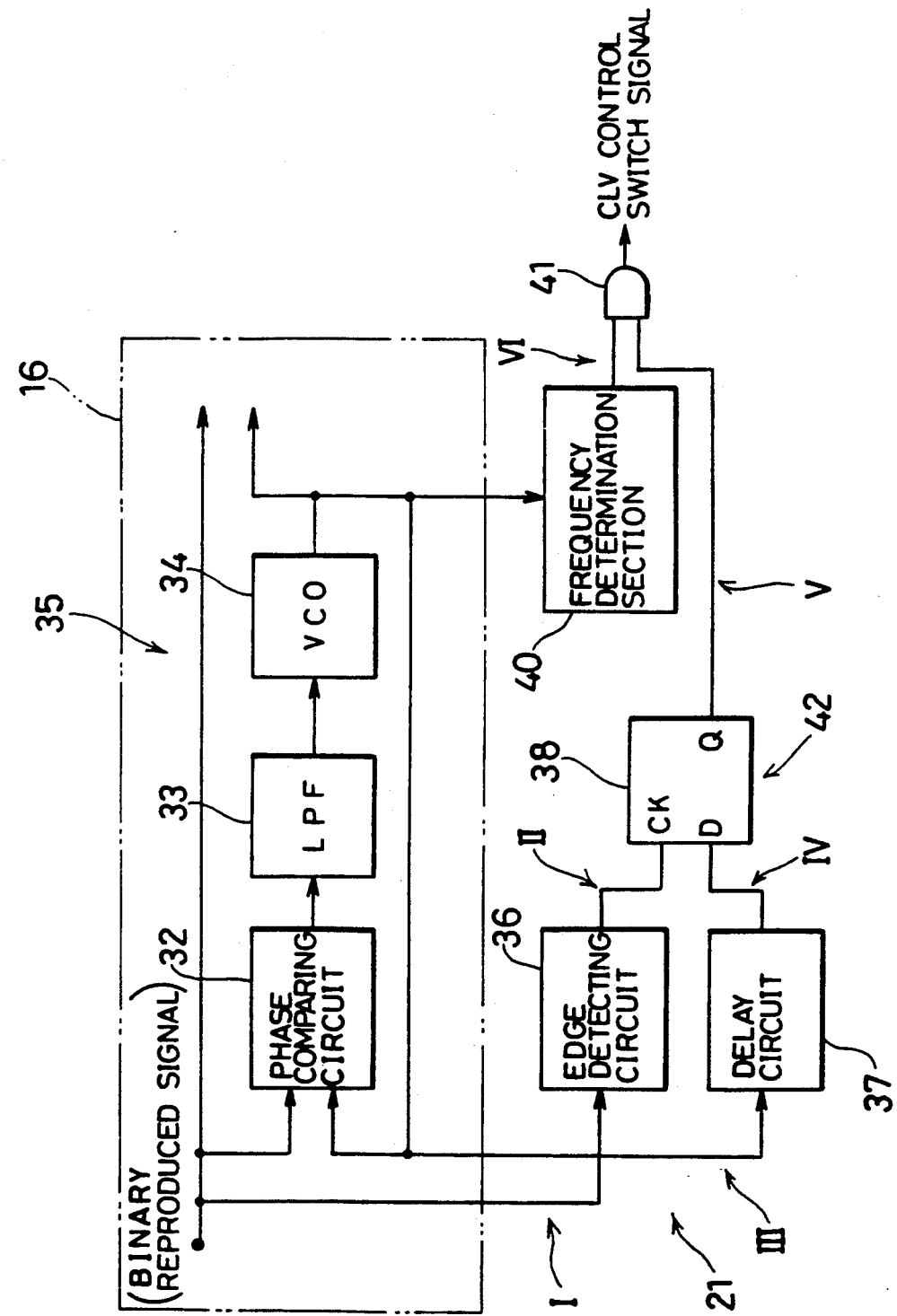

As illustrated in FIG. 8, in this third embodiment, it is determined by means of the reproduced signal state detecting circuit 21 whether a phase shift occurs in a phase locked loop 35 included in the reproduced signal processing circuit 16. When phase shift occurs, the CLV control is switched.

The reproduced signal processing circuit 16 comprises a phase locked loop (PLL) 35 composed of a phase comparing circuit 32, a low-pass filter (LPF) 33 and a voltage controlled oscillator (VCO) 34. Meanwhile the reproduced signal state detecting circuit 21 includes an edge detecting circuit 36, a delay circuit 34, a D type flip-flop 38, a frequency determination section 40 and an AND circuit 41. The edge detecting circuit 36, the delay circuit 37 and the flip-flop 38 form a phase determination section 42.

A binary reproduced signal I is released by the reproduced signal processing 16 and fed into the edge detecting circuit 36. Bump edges produced by the transitions between the low level corresponding to "0" and the high level corresponding to "1" of the binary reproduced signal I, are detected in the edge detecting circuit 36, and an edge signal II that falls in syncrhonization with each bump edge is fed into a clock input terminal CK of the flip-flop 38. A clock signal III released by the VCO 34 is fed into the delay circuit 37 where its cycle is delayed by ¼ of a cycle. A delayed signal IV obtained as the clock signal III is delayed in the delay circuit 37, is sent to the data input terminal D of the flip-flop 38. Furthermore, a phase determination signal V released from the output terminal Q of the flip-flop 38, and a frequency determination signal VI released by the frequency determination section 40 are fed into the AND circuit 41.

The phase determination signal V is in the high level when there is no phase difference in the PLL 35 and the frequency determining signal VI is in the high level when the frequency of the clock signal III is correct. The CLV control is switched when the CLV control switch signal released by the AND circuit 41 is in the low level. In addition, the frequency determination section 40 is designed to determine whether the frequency of the clock signal III is within a predetermined range.

Figure 9:
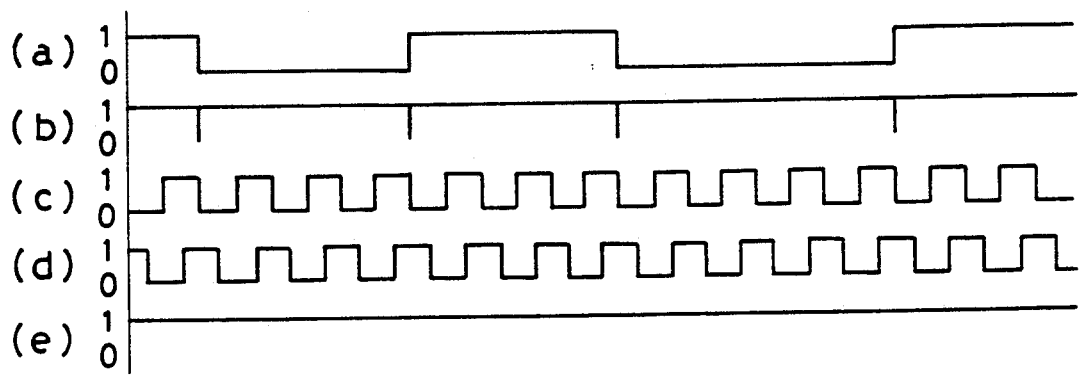
Figure 10:
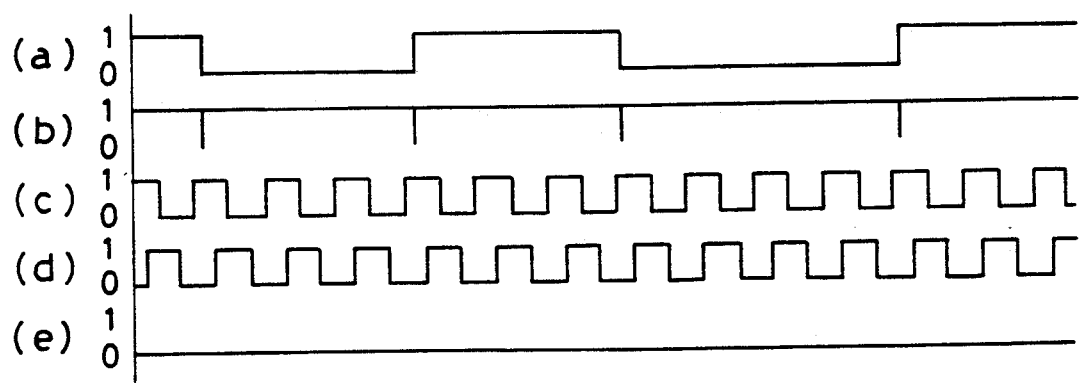
Figure 11:
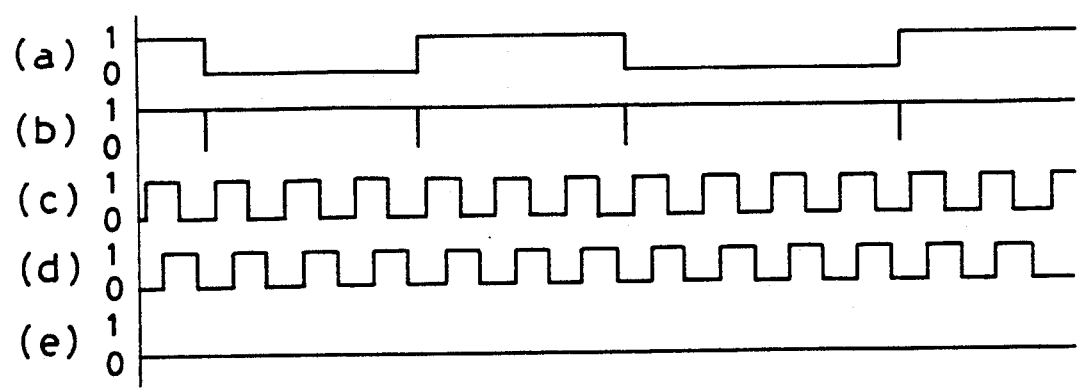

Time charts of the signals I to V in the phase determination section 42 are illustrated in FIG. 9 to FIG. 11. In the figures, (a) to (e) represent the variations of the binary reproduced signal I, the edge signal II, the clock signal III, the delay signal IV and the phase determination signal V respectively.

FIG. 9 illustrates a case where the PLL 35 is in a locked condition and the binary reproduced signal I and the clock signal III are in phase. As it appears clearly when (b) and (d) of FIG. 9 are compared, the delay signal IV is always in the high level when the edge signal II falls whereby the phase determination signal V released by the flip-flop 38 is always in the high level. At this time, if in the frequency determination section 40 it is determined that the frequency of the clock signal III is comprised within a proper range and the frequency determination signal VI is in the high level, the CLV control switch is not performed.

Next, a case where the phase of the clock signal III of the phased locked loop 35 lags behind is illustrated in the time chart of FIG. 10. As shown by (c) in FIG. 10, the clock signal III lags behind the binary reproduced signal I by approximately two-fifths of a cycle. As a result, the delay signal IV is always on the low level when the edge signal II falls as is the phase determination signal V This causes the CLV control switch signal released by the AND circuit 41 to be in the low level and the switch of the CLV control to be executed.

Further, the time chart of FIG. 11 illustrates a case where the phase of the clock signal III of the phase locked loop 35 is leading. In this case, the clock signal III, as shown by (c) in FIG. 11, is ahead of the binary reproduced signal I by approximately two-fifths of a cycle. As a result, the delay signal IV is always in the low level when the edge signal II falls, as is the phase determination signal V. In this case too, the CLV control switch signal released by the AND circuit 41 is in the low level and the switch of the CLV control is executed.

Still another embodiment of the reproduced signal state detecting circuit 21 will be described with reference to FIG. 12.

The present fourth embodiment is effective when a D.C. free modulation method is adopted. The D.C. free modulation method is a modulation method where the signal format used is such that there is no difference between the average level and the zero level of the binary reproduced signals, i.e. when the energy densities of "1" and "0" are both approximately equal to 50%. Whether the reproduced signals are in an appropriate condition is determined in the reproduced signal state detecting circuit 21. If the condition of the reproduced signals is poor, the CLV control is changed to the CLV control executed according to the reproduced signals of the pre-recorded information.

Figure 12:
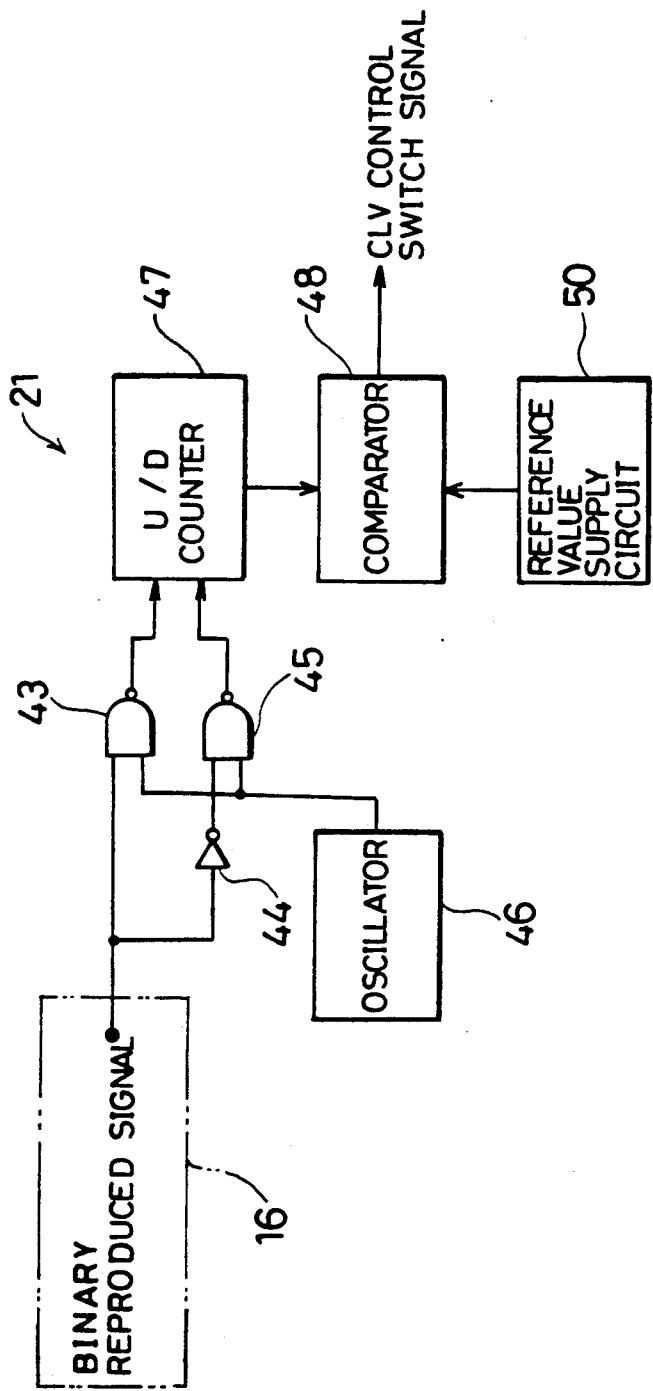
FIG. 12, FIG. 13, and FIG. 14 are block diagrams respectively illustrating essentail parts of optical disk recording/reproducing devices of a fourth, a fifth and a sixth embodiment.

As illustrated in FIG. 12, binary reproduced signals released from the reproduced signal processing circuit 16 are fed into one of the input terminals of a NAND circuit 43 and are fed into one of the input terminals of a NAND circuit 45 through an inverter 44. Pulses sent from an oscillator 46 are entered in the other input terminal of the NAND circuit 43 and the other input terminal of the NAND circuit 45. Output signals released by the NAND circuit 43 are fed into an addition input terminal of an updown (U/D) counter 47 while output signals produced by the NAND circuit 45 are fed into the subtraction input terminal of the updown counter 47. With such an arrangement, if, when a pulse is entered from the oscillator 46, the binary reproduced signal is in the high level corresponding to "1", the updown counter 47 counts up. Meanwhile, if the binary reproduced signal is in the low level corresponding to "0" when a pulse is entered from the oscillator 46, the updown counter 47 counts down. The value released by the updown counter 47 is compared with a reference value supplied from a reference value supply circuit 50 in a comparator 48. When the value obtained in the updown counter 47 is greater than the reference value, it is assumed that anomalies arose in the energy densities of "1" and "0" of the binary reproduced signals and that the condition of the reproduced signals is poor. The comparator 48 consequently releases a CLV control switch signal.

Another embodiment of the reproduced signal state detecting circuit 21 will be described hereinbelow.

The optical disk recording/reproducing device of the present fifth embodiment is designed such that, if during reproduction, the optical head 4 entered into an unrecorded area of the information recording area 1b, the CLV control is switched to the CLV control executed according to the reproduced signals of the pre-recorded information.

Figure 13:
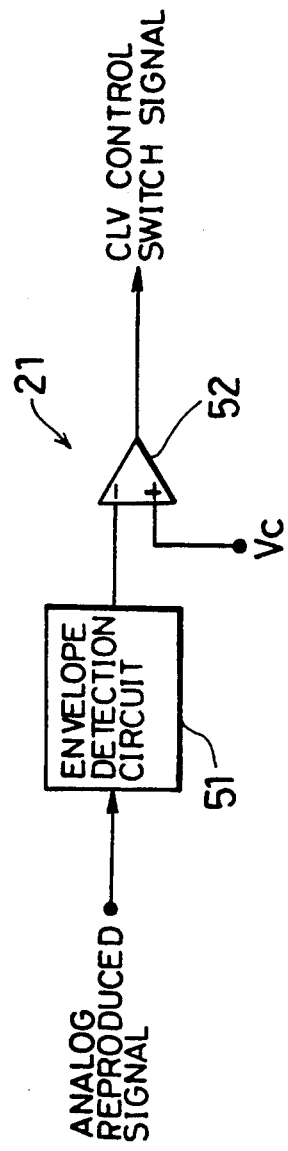

As illustrated in FIG. 13, the reproduced signal state detecting circuit 21 comprises an envelope detecting circuit 51 and a comparator 52. An analog reproduced signal before it is converted into a binary reproduced signal, is produced by the reproduced signal processing circuit 16 shown in FIG. 4 and fed into the envelope detecting circuit 51.

With the above arrangement, the envelope detection of the analog reproduced signal is performed in the envelope detecting circuit 51. The voltage of the output signal obtained after the detection, is compared with a reference voltage Vc in a comparator 52. When the optical head 4 is positioned over an unrecorded area where no reproduced signal is detected, the voltage of the envelope detection signal is below the reference voltage Vc. As a result, the CLV control switch signal released by the comparator 52 changes to the low level causing the CLV control to be switched to the CLV control based on the reproduced signals of the pre-recorded information during the reproduction also.

Next, another embodiment of the reproduced signal state detecting circuit 21 will be described.

In this sixth embodiment also, the optical disk recording/reproducing device is designed such that, when during the reproduction the optical head 4 is positioned over an unrecorded area, the CLV control is switched to the CLV control executed according to the reproduced signals of the pre-recorded information.

Figure 14:
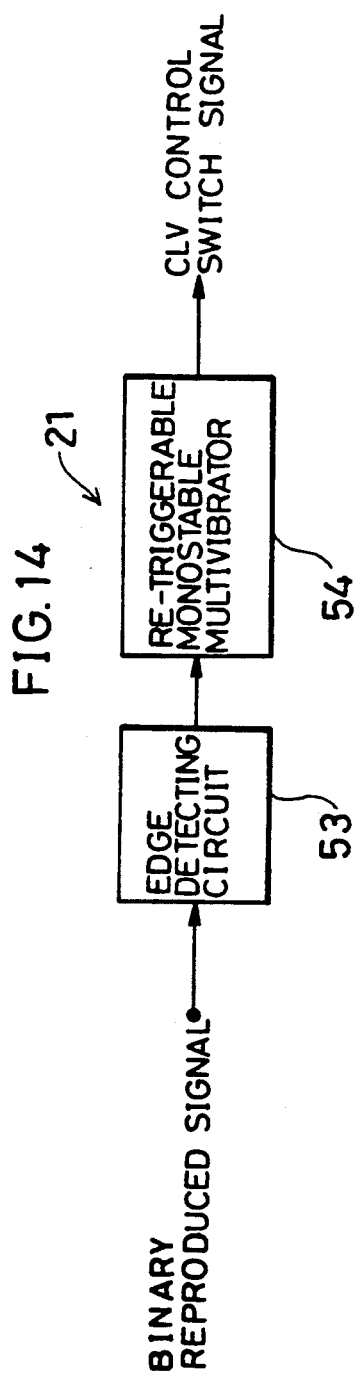

As illustrated in FIG. 14, the reproduced signal state detecting circuit 21 comprises an edge detecting circuit 53 and a re-triggerable monostable multivibrator 54. Two-value reproduced signals released from the reproduced signal processing circuit 16, are fed into the edge detecting circuit 53. The time constant of the re-triggerable monostable multivibrator 54 is set so as to be, for example, slightly longer than the maximum length separating two edges of a binary reproduced signal shown by (b) in FIG. 9. The maximum distance separating two edges of a binary reproduced signal corresponds, for example, to 11 bits in an EFM signal. As a result, when the optical head 4 is positioned over a recorded area of the information recording area 1b, and binary reproduced signals are entered into the edge detecting circuit 53, and the re-triggerable monostable multivibrator 54 is triggered in a repetitive manner, thereby producing a signal that is constantly in the high level. In this case, the CLV control is not changed.

On the other hand, when the optical head 4 is positioned over an unrecorded area and no binary reproduced signal is entered in the edge detecting circuit 53, the detection of edges does not take place. Accordingly, the re-triggerable monostable multivibrator 54 is not triggered and releases a low level CLV control switch signal, causing the CLV control to be switched to the CLV control executed according to the pre-recorded information during the reproduction also.

Figure 15B:
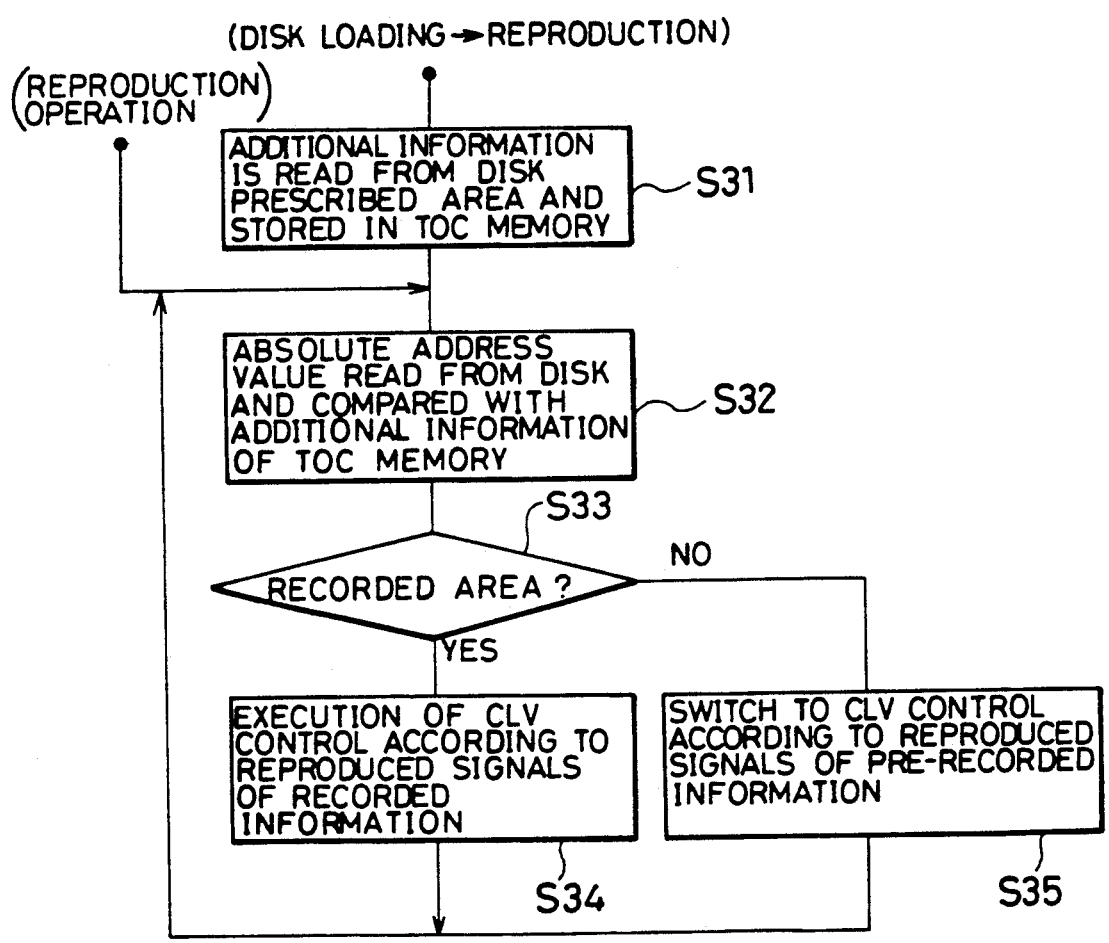
FIG. 15(b) is a flow chart illustrating a CLV control procedure during a reproduction.

A seventh embodiment of the present invention will be described hereinbelow with reference to FIG. 15 and FIG. 16. For reasons of convenience, the members having the same functions than in the previous embodiments will be designated by the same code and their description will be omitted.

Figure 16:
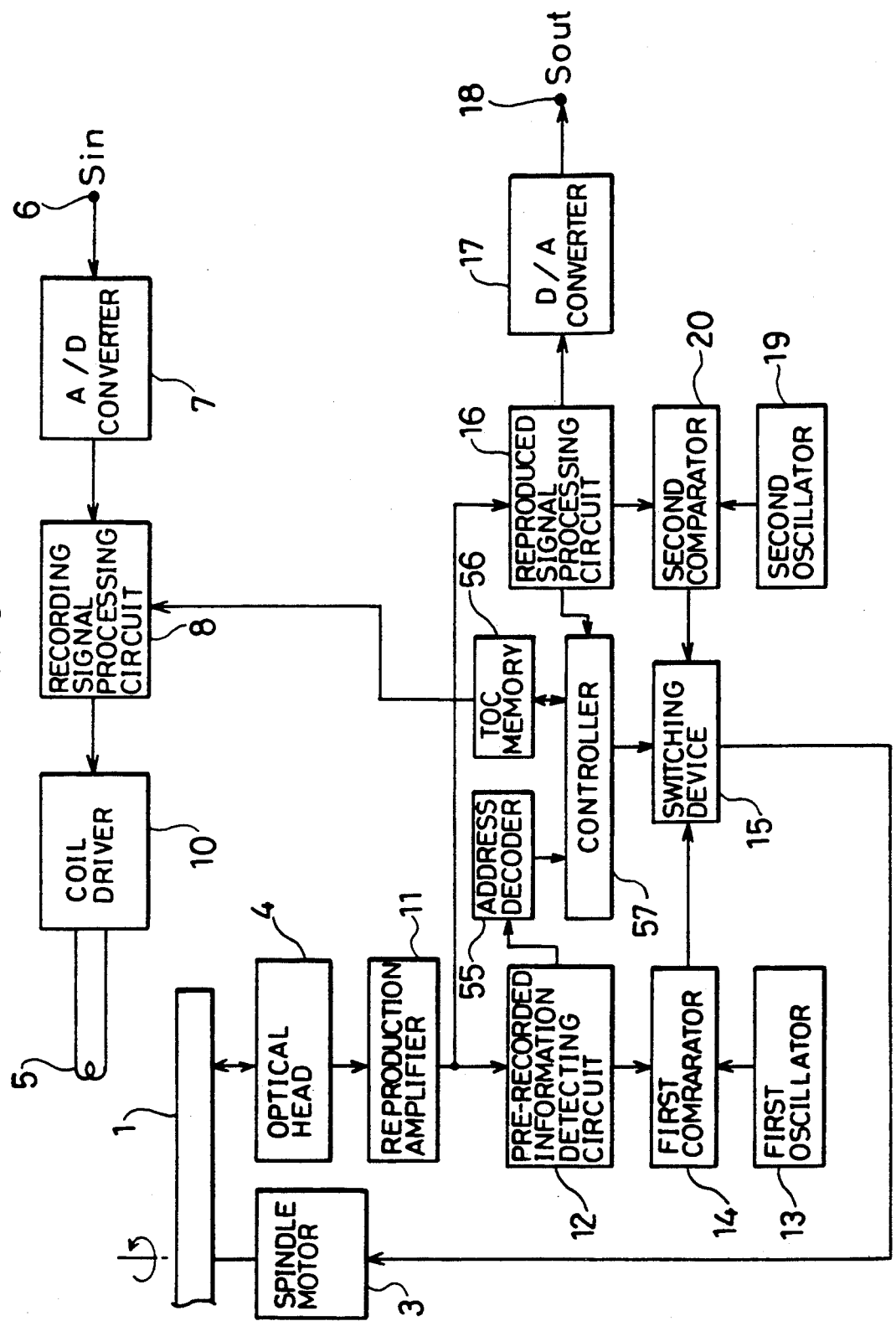

As illustrated in FIG. 16, the optical disk recording/reproducing device of the present embodiment differs from the optical disk recording/reproducing devices of the previous embodiments in that it is not equipped with the reproduced signal state detecting circuit 21. FIG. 16 shows an address decoder 55, a TOC memory 56 and a controller 57 that are always part of the optical disk recording/reproducing device.

The address decoder 55 decodes the sequences of data of the absolute addresses that went through the Biphasemark demodulation process described earlier. The absolute addresses are recognized in the controller 57 based on the results obtained in the address decoder 55. The address decoder 55 and a TOC memory 56 constitute an address management section.

During recording, the absolute addresses indicating recording start positions and the absolute addresses indicating recording end positions mentioned earlier (hereinafter referred to as recording start/end absolute addresses) are read from the TOC memory 56 by means of a recording/reproduction control section (not shown) comprised in the controller 57. The coil driver 10 drives the coil 5 and the optical head 4 to access the TOC area 1a in response to the instruction of the recording/reproduction control section. This instruction is based on the absolute addresses supplied by the pre-recorded information detecting circuit 12 and the address decoder 55. In such a manner, the recording start-/end absolute addresses are recorded in the TOC area 1a after going through a prescribed signal process in the recording signal processing circuit 8.

On the other hand, during reproduction, the recording start/end absolute addresses recorded in the TOC area 1a are stored in the TOC memory 56 of the address management section following the instruction of the recording/reproduction control section. Besides, absolute addresses processed and detected one after another in the pre-recorded information detecting circuit 12, are also fed into the TOC memory 56. The recording start-/end absolute addresses and the absolute addresses detected one after another are compared in a comparison section (not shown) included in the controller 57. According to the result of the comparison, the comparison section determines whether the optical head 4 is reproducing a recorded area or an unrecorded area of the information recording area 1b.

A recording control operation that follows the flow illustrated in FIG. 15(a) and that is performed by control means composed of the controller 57 and other members will be described hereinbelow. First, a switch control section of the controller 57 (not shown) switches the switching device 15 toward the first comparator 14. Consequently, the CLV control of the spindle motor 3 is executed based on the reproduced signals of the pre-recorded information (S21). When the recording of audio information or other information starts, the corresponding recording start absolute address is stored in the TOC memory 56 (S22). When the recording of the audio information or other information is completed, the corresponding recording end absolute address is also stored in the TOC memory 56 (S23). Then, the recording start/end absolute addresses are recorded as additional information in the TOC area 1a of the magneto-optical disk 1 as described earlier (S24).

On the other hand, during reproduction of signals, the control means switches the switching device 15 toward the comparator 20 permitting the CLV control of the spindle motor 3 to be performed according to the reproduced signals of the recorded information. A reproduction control operation performed by the control means that follows the flow illustrated in FIG. 15(b) will be described hereinbelow. During the reproduction of signals, first, preceding the reproduction of the signals, the additional information written in the TOC area 1a is reproduced, and the recording start/end absolute addresses are read through the reproduced signal processing circuit 16 and stored in the TOC memory 56 (S31). Next, the absolute addresses obtained one after another as the pre-recorded information pre-recorded on the magneto-optical disk 1 are reproduced, and compared with the recording start/end absolute addresses stored in the TOC memory 56 (S32). Then, it is determined whether the optical head 4 is located over a recorded area or an unrecorded area (S33). For instance, if the absolute addresses reproduced one after another, are greater than the recording start absolute address and smaller than the recording end absolute address, the optical head 4 is located over a recorded area. Accordingly, the switching device 15 stays connected to the second comparator 20 and the CLV control is performed based on the reproduced signals of the recorded information (S34). On the other hand, when the absolute addresses reproduced one after another are smaller than the recording start absolute address, or greater than the recording end absolute address, the optical head 4 is positioned over an unrecorded area. The switching device 15 is consequently switched from the second comparator 20 to the first comparator 14. As a result, the CLV control changes from the CLV control executed according to the reproduced signals of the recorded information to the CLV control executed according to the reproduced signals of the pre-recorded information (S35).

Accordingly, in the cases where a CLV control executed according to the reproduced signals of the recorded information is infeasible such as for example when the optical head 4 entered into an unrecorded area, an alternative method that consists in performing the CLV control based on the reproduced signals of the pre-recorded information during reproduction also, is employed. Inconveniences such as the infeasibility of the CLV control during reproduction, are thus eliminated. Moreover, in the present seventh embodiment, whether the optical head 4 is positioned over a recorded or unrecorded area, is determined by merely comparing the absolute addresses. There is thus no need to implement an additional detecting means and the configuration of the circuit may be simplified.

In the above embodiments, the absolute addresses recorded on the magneto-optical disk 1 went through a Biphasemark modulation process. However, these are not restrictive examples, and other modulation methods that restrict the frequency bandwidth may be adopted.

Also, in the above embodiments, the magneto-optical disk was taken as an example of optical disk. However, the present invention may be applied to other Rewritable optical disks such as optical disks of the phase change type, or to Write-Once type optical disks.

Further, in the above embodiments, the absolute addresses serving as pre-recorded information were recorded on the optical disk by having the guiding groove 2 deviate. The absolute addresses may also be recorded on the optical disk in the form of aligned pits. In this case, the CLV control based on the reproduced signals of the pre-recorded information is carried out by comparing the cycle at which the pits are reproduced, with a predetermined reference frequency.

Furthermore, the above embodiments described a case where the pre-recorded information is recorded on the optical disk in the form of absolute addresses. However, the pre-recorded information may also be recorded by having the guiding groove 2 snake.

In addition, in the above embodiments, the unrecorded areas represented areas of the information recording area 1b that were not recorded. However, the present invention may be applied to for example unnecessary areas such as blank spaces or unstable recorded areas of recorded areas.

As described above, an optical disk recording/reproducing device in accordance with the present invention comprises control means for executing the rotation control of an optical disk in Constant Linear Velocity such that:

during recording, the rotation control is carried out based on the reproduced signals of pre-recorded information that was preliminary recorded on the optical disk, during reproduction, the rotation control is carried out based on the reproduced signals of recorded information, and when the rotation control based on the reproduced signals of the recorded information is infeasible, the control is switched to the rotation control based on the reproduced signals of the pre-recorded information during reproduction also.

With the above arrangement, the rotation control in Constant Linear Velocity is carried out according to the reproduced signals of the pre-recorded information during recording, and based on the reproduced signals of the recorded information during reproduction. This arrangement enables an appropriate and suitable rotation control to be performed during recording and during reproduction.

In addition, when during reproduction, the rotation control based on the reproduced signals of the recorded information is infeasible because reproduction errors occur frequently, or because reproduced signals cannot be obtained became the optical head entered into an unrecorded area, an alternative method can be adopted. The alternative method consists of switching and executing the rotation control according to the reproduced signals of the pre-recorded information. Difficulties such as the infeasibility of the CLV control during reproduction, may be thus eliminated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical disk recording/reproducing device comprising:
   driving means for driving an optical disk to rotate; and
   control means for controlling said driving means to drive said optical disk to rotate at a Constant Linear Velocity;
   said control means including,
      first control means for controlling said driving means during recording, according to reproduced signals of pre-recorded information stored on said optical disk,
      second control means for controlling said driving means during reproduction, according to reproduced signals of recorded information stored on said optical disk, and
      switching means for switching control of said driving means during reproduction to said first control means when controlling said driving means according to said second control means is impractical.

2. The optical disk recording/reproducing device of claim 1, wherein said optical disk includes pre-recorded rotation control information for controlling the rotation of said optical disk at a Constant Linear Velocity and further comprising:
   reproduced signal state detecting means for determining a condition of reproduced signals during reproduction.

3. The optical disk recording/reproducing device of claim 1, wherein said optical disk included pre-recorded rotation control information for controlling the rotation of said optical disk at a Constant Linear Velocity; and further comprising:
   address management means for managing address information reproduced from said optical disk;
   said address management means including,
      recording start position means for storing, at the beginning of a recording operation, at least one absolute address, according to pre-recorded information, which represents recording start position information, and
      recording stop position means for storing, at the end of a recording operation, at least one absolute address, according to pre-recorded information, which represents recording end position information.

4. The optical disk recording/reproducing device of claim 3, wherein said control means further comprises:
   recording/reproduction control means for recording at least one absolute address which represents recording start position information and at least one absolute address which represents recording stop position information in a predetermined area of said optical disk during recording, and for reading at least one absolute address which represents recording start position information and at least one absolute address which represents recording stop position information that is recorded in said predetermined area of said optical disk during reproduction;
   comparing means for comparing a sequence of absolute addresses that are reproduced as reproduction position information with the absolute addresses which represent recording start position and recording stop position information stored by said address management means;
   said comparing means determining that a recorded area is being reproduced when the sequence of absolute addresses are greater than the absolute address which represents recording start position information and smaller than the absolute address which represents recording stop position information;
   said comparing means determining that an unrecorded area is being reproduced when the sequence of absolute addresses are smaller than the absolute address which represents recording start position information or greater than the absolute address which represents recording stop position information;

said switching means switching control, when a recorded area is being reproduced, to said second control means to generate a Constant Linear Velocity, and when an unrecorded area is being reproduced, to said first control means to generate a Constant Linear Velocity.

5. The optical disk recording/reproducing device of claim 2 or claim 4, wherein said optical disk comprises:
- an information recording area where various types of information are recorded;
- a table of contents area where additional information indicating recording start position information and recording end position information and other information, are recorded; and
- a guiding groove formed in said information recording area and said table of contents area with a predetermined pitch in a radial of said optical disk for tracking control during recording or reproduction, wherein the pre-recorded information is recorded on said optical disk by having said guiding groove deviate inward or outward in a radial direction of said optical disk depending on whether a binary code of absolute addresses is a logic 1 or a logic 0, said absolute addresses representing recording start position information and recording stop position information, the pre-recorded information being modulated to restrict frequency bandwidth.

6. An optical disk recording/reproducing device comprising:
- driving means for supporting and driving a magneto-optical disk;
- coil means for applying a magnetic field to the magneto-optical disk during recording;
- input terminal means for receiving analog information to be recorded;
- analog to digital converting means for converting the received analog information to digital information;
- coil driving means for driving said coil means in response to the digital information received from said analog to digital converting means;
- optical head means, operatively connected to said coil driving means, for projecting a laser beam onto the magneto-optical disk to record a magneto-optical signal onto the magneto-optical disk and for reproducing a signal previously recorded on the magneto-optical disk;
- reproduction amplifying means for amplifying the reproduced magneto-optical signal reproduced by said optical head means;
- pre-recorded information detecting means for receiving the amplified signal from said reproduction amplifying means and for extracting a clock signal from the amplified signal;
- first oscillating means for generating a first reference frequency;
- first comparing means for comparing the clock signal extracted by said prerecorded information detecting means with the first reference frequency generated by said first oscillating means for outputting a first differential signal;
- reproduced signal processing means for receiving and modulating the amplified signal from said reproduction amplifying means, for detecting whether a frame synchronization signal is present in the amplified signal, and for generating a sychronizing signal detection pulse when said frame sychronization signal is present in the amplified signal;
- second oscillating means for generating a second reference frequency;
- second comparing means for comparing the synchronizing signal detection pulse with the second reference frequency and for outputting a second differential signal;
- reproduced signal state detecting means for determining whether the reproduced recorded magneto-optical signal recorded on the magneto-optical disk is reproduced correctly and for determining whether said optical head means reproduced a recorded magneto-optical signal from a recorded area of said magneto-optical disk;
- a control circuit;
- said control circuit including,
  - pre-recorded Constant Linear Velocity control means for performing Constant Linear Velocity control, during recording, according to the reproduced signals of the pre-recorded information and for performing Constant Linear Velocity control, during reproduction, according to the reproduced signals of the pre-recorded information, when said reproduced signal state detecting means determines that the recorded information has been reproduced incorrectly,
  - recorded Constant Linear Velocity control means for performing Constant Linear Velocity control, during reproduction, according to the reproduced signals of the recorded information, when said reproduced signal state detecting means determines that the recorded information has been reproduced correctly, and
  - switching means for switching Constant Linear Velocity control to one of said pre-recorded Constant Linear Velocity control means and said recorded Constant Linear Velocity control means;
- digital to analog converting means for converting the modulated signal generated by said reproduced signal processing means into an analog output signal; and
- output terminal means for outputting the analog output signal.

7. An optical disk recording/reproducing device comprising:
- an optical disk, wherein pre-recorded information signals which represent recording and reproduction positions are previously stored in all frames on said optical disk and recorded information signals are stored on and reproduced from said optical disk;
- driving means for driving said optical disk to rotate;
- pre-recorded information reproducing means for reproducing the pre-recorded information signals stored on said optical disk;
- recorded information reproducing means for reproducing the recorded information signals stored on said optical disk;
- reproduced signal state detecting means for determining whether the recorded information signals are reproduced in a predetermined condition by said recorded information reproducing means;
- first velocity control information generating means for generating first velocity control information based on the pre-recorded information signals released from said pre-recorded information reproducing means, said first velocity control information being transmitted to said driving means to drive said optical disk to rotate at a Constant Linear Velocity;

second velocity control information generating means for generating second velocity control information based on the recorded information signals released from said recorded information reproducing means, said second velocity control information being transmitted to said driving means to drive said optical disk to rotate at a Constant Linear Velocity;

switching means connected to said driving means, said first velocity control information generating means, and said second velocity control information generating means, for transmitting one of said first velocity control information and said second velocity control information to said driving means; and control means for controlling said switching means to transmit said first velocity control information to said driving means during recording, to transmit said second velocity control information to said driving means during reproduction, and to transmit said first velocity control information to said driving means during reproduction when said reproduced signal state detecting means determines that the recorded information signals have not been reproduced in the predetermined condition.

8. The optical disk recording/reproducing device of claim 7, further comprising:

reproduced signal processing means for performing a predetermined demodulation process on the reproduced signals of recorded information, for detecting a frame synchronization signal in each frame of reproduced signals of recorded information, for generating a synchronizing signal detection pulse for each frame of reproduced signals of said recorded information, for which a frame synchronization signal was detected, and for generating a synchronizing signal absence pulse for each frame of reproduced signals of said recording information, for which a frame synchronization signal was not detected;

said reproduced signal state detecting means including, counting means for receiving the synchronizing signal detection pulse and the synchronizing signal absence pulse and for counting the number of times said synchronizing signal absence pulse is received and for resetting when a synchronizing signal detection pulse is received, reference value supplying means for supplying a reference value, and comparing means for comparing the number of times said synchronizing signal absence pulse was received by said counting means with said reference value and for transmitting to said control means a Constant Linear Velocity control switch signal which indicates that said recorded information signals are not reproduced in the predetermined state, when the number of received synchronizing signal absence pulses is greater than the reference value;

said control means controlling said switching means to transmit said first velocity control information to said driving means upon receipt of said Constant Linear Velocity Control switch signal.

9. The optical disk recording/reproducing device of claim 7, further comprising:

reproduced signal processing means for performing a predetermined demodulation process on the reproduced signals of recorded information, for detecting a frame synchronization signal in each frame of reproduced signals of recorded information, for generating a synchronizing signal detection pulse for each frame of reproduced signals of said recorded information, for which a frame synchronization signal was detected, and for generating an error flag which is at a high level when a reproduction error occurred in said frames and which is at a low level when there is no reproduction error;

said reproduced signal state detecting means including, counting means for counting the reproduction errors in response to said error flag, inverting means for inverting the high level and the low level of said error flag generated by said reproduced signal processing means, first NAND means for receiving the synchronizing signal detection pulse and the inverted error flag to produce a reset counter pulse when said error flag is at the low level, second NAND means for receiving the synchronizing signal detection pulse and the error flag to produce an upcount pulse when said error flag is at the high level, reference value supplying means for supplying a reference value, and comparing means for comparing the number of reproduction errors counted by said counting means with said reference value and for transmitting to said control means a Constant Linear Velocity control switch signal which indicates that said recorded information signals are not reproduced in the predetermined state, when the number of reproduction errors counted is greater than said reference value;

said control means controlling said switching means to transmit said first velocity control information to said driving means upon receipt of said Constant Linear Velocity Control switch signal.

10. The optical disk recording/reproducing device of claim 7, further comprising:

a reproduced signal processing circuit;

said reproduced signal processing circuit including, signal processing means for performing a predetermined demodulation process on the reproduced signals of said recorded information, and phase locked loop including, phase comparing circuit, low-pass filter and, voltage controlled oscillator;

said reproduced signal state detecting means including, phase determination means for determining whether said phase locked loop is in a locked condition, and for providing a high phase locked signal when said phase locked loop is locked, frequency determination means for determining whether the frequency of a clock signal produced by said voltage controlled oscillator is within a predetermined frequency range and for producing a high clock signal when the frequency of said clock signal is within the predetermined frequency range, and AND means for transmitting to said control means a Constant Linear Velocity control switch signal which indicates that said recorded information signals are not reproduced in the predetermined state, when at least one of the high phase locked signal produced by said phase determination means and the high clock signal produced by said frequency determination means is at the low level said control means controlling said switching means to transmit said first velocity control information to said driving means upon receipt of said Constant Linear Velocity Control switch signal.

11. The optical disk recording/reproducing device of claim 10, wherein said phase determination means further comprises:

edge detecting means for detecting bump edges produced by a transition between the high level and the low level of the demodulated reproduced signals of said recorded information and for producing an edge signal in synchronization with each of the bump edges;

a delay means for receiving the clock signal and for providing a delayed signal by delaying the cycle of said clock signal by $\frac{1}{4}$ of a cycle; and a D type flip-flop including,
 a clock input terminal for receiving the edge signal, data input terminal for receiving the delayed signal, and
 an output terminal for producing a high comparison signal when said phase locked loop is locked and for sending the high comparison signal to said AND circuit.

12. The optical disk recording/reproducing device of claim 7, further comprising:

reproduced signal processing means for performing a predetermined demodulation process on the reproduced signals of said recorded information and for producing binary reproduced signals;

said reproduced signal state detecting means including,
 an updown counter provided with an addition input terminal and a subtraction input terminal,
 invertor means for inverting the high level and the low level of said binary reproduced signals produced by said reproduced signal processing means,
 oscillator means for producing a pulse of a predetermined frequency,
 first NAND means for receiving the binary reproduced signals produced by said reproduced signal processing means and the pulse produced by said oscillator means and for producing an upcount signal to be applied to said addition input terminal of said updown counter so that said updown counter counts up, when said binary reproduced signals are at the high level,
 second NAND means for receiving the inverted binary reproduced signals produced by said invertor and the pulse produced by said oscillator means and for producing a downcount signal to be applied to said subtraction input terminal of said updown counter so that said updown counter counts down when said binary reproduced signals are at the low level,
 reference value supply means for supplying a reference value, and
 comparing means for comparing the value of said updown counter with said reference value and for transmitting to said control means a Constant Linear Velocity control switch signal which indicates that said recorded information signals are not reproduced in the predetermined state, when the counted value is greater than said reference value;

said control means controlling said switching means to transmit said first velocity control information to said driving means upon receipt of said Constant Linear Velocity Control switch signal.

13. The optical disk recording/reproducing device of claim 7, wherein said reproduced signal state detecting means comprises:

envelope detecting means for receiving the analog reproduced signals of said recorded information before the reproduced signals of said recorded information go through a predetermined demodulation process and for generating an envelope detection signal for said analog reproduced signals; and comparing means for comparing a voltage of an envelope detection signal with a reference voltage and for transmitting to said control means a Constant Linear Velocity control switch signal which indicates that said recorded information signals are not reproduced in the predetermined state, when said voltage of said envelope detection signal is less than said reference voltage;

said control means controlling said switching means to transmit said first velocity control information to said driving means upon receipt of said Constant Linear Velocity Control switch signal.

14. The optical disk recording/reproducing device of claim 7, further comprising:

reproduced signal processing means for performing a predetermined demodulation process on the reproduced signals of said recorded information and for producing binary reproduced signals;

said reproduced signal state detecting means including,
 edge detecting means for detecting bump edges produced by a transition between a high level and low level of the binary reproduced signals, and
 re-triggerable monostable multivibrator whose time constant is set such as to be slightly longer than a maximum value of a distance separating neighboring bump edges in said binary reproduced signals;
 said re-triggerable monostable multivibrator being arranged such that when the binary reproduced signals are not received by said edge detecting means, said re-triggerable multivibrator transmitting to said control means a Constant Linear Velocity control switch signal which indicates that said recorded information signals are not reproduced in the predetermined state, said control means controlling said switching means to transmit said first velocity control information to said driving means upon receipt of said Constant Linear Velocity Control switch signal;
 said re-triggerable monostable multivibrator being triggered repetitively and producing a constant high signal which does not cause the switch of the rotation control when said binary reproduced signals are received by said edge detecting means.

15. The optical disk recording/reproducing device of claim 4, further comprising:
   pre-recorded information demodulation means for demodulating the pre-recorded information on said optical disk to restrict the frequency bandwidth;
   said address management means further including,
   address decoder means for decoding absolute addresses indicating recording/reproduction position information on said optical disk, and
   table of contents memory means for storing the absolute addresses indicating recording start position information and the absolute addresses indicating recording end position information.

16. The optical disk recording/reproducing device of claim 7, wherein
   said pre-recorded information reproducing means and said recorded information reproducing means comprise optical head means for reading information recorded on said optical disk;
   said optical disk including,
   an information recording area where a plurality of types of information are recorded,
   a table of contents area where additional information concerning said plurality of types of information, are recorded, and
   a guiding grove formed in said information recording area and in said table of contents area with a predetermined pitch in a radial direction of said optical disk for tracking control during recording or reproduction; and
   the pre-recorded information signals represent absolute addresses, each indicating one of a recording and reproduction position on said optical disk.

17. The optical disk recording/reproducing device of claim 16, wherein said pre-recorded information signals are modified to restrict frequency bandwidth and converted into a binary code so that said pre-recorded information reproducing means extracts the pre-recorded information signals from output signals released from said optical head means and are recorded on said optical disk by having said guiding groove deviate inward or outward in the radial direction of said optical disk depending on whether said binary code is a logic 1 or a logic 0.

18. The optical disk recording/reproducing device of claim 16, further comprising:
   address generating means for generating said absolute addresses from the pre-recorded information signals reproduced by said pre-recorded information reproducing means;
   memory means for, at a start of recording, storing at least one absolute address generated by said address generating means which represents recording start position information, and for, at an end of recording, storing at least one absolute address generated by said address generating means which represents recording stop position information; and
   recording means for recording on said optical disk;
   said reproduced signal state detecting means including,
   recording/reproduction control means for, during recording, recording in said table of contents area at least one absolute address stored by said memory means which represents recording start position information and at least one absolute address stored by said memory means which represents recording stop position information, utilizing said recording means, and for, during reproduction, reading at least one absolute address stored by said table of contents area which represents recording start position information and at least one absolute address stored by said table of contents area which represents recording stop position information, and
   comparing means for comparing a sequence of absolute addresses that are reproduced as reproduction position information by said address generating means with the absolute address which represent recording start position and recording stop position information stored by memory means;
   said comparing means determining that said optical head means is positioned upon a recorded area when the sequence of absolute addresses are greater than the absolute address which represents recording start position information and smaller than the absolute address which represents recording stop information;
   said comparing means determining that said optical head means is positioned upon an unrecorded area when the sequence of absolute addresses are smaller than the absolute address which represents recording start position or greater than the absolute address which represents recording stop information.

19. The optical disk recording/reproducing device of claim 18, wherein said prerecorded information reproducing means comprises:
   band-pass filter means for extracting said pre-recorded information signals from output signals released from said optical head means; and
   phase lock loop means for generating a clock signal that is in synchronization with said pre-recorded information signals extracted by said band-pass filter means.

20. The optical disk recording/reproducing device of claim 18, wherein said first velocity control information generating means comprises:
   first oscillating means for supplying a first reference frequency; and
   first comparing means for comparing a frequency of said clock signal and said first reference frequency to produce a difference signal which represents said first velocity control information.

21. The optical disk recording/reproducing device of claim 18, wherein said second velocity control information generating means comprises:
   reproduced signal processing means for performing a predetermined demodulation process on the recorded information signals, for detecting a frame synchronization signal in each frame of the recorded information signals, and for generating a synchronizing signal detection pulse for each frame of the recorded information signals, for which a frame synchronization signal was detected;
   second oscillating means for supplying a second reference frequency; and
   second comparing means for comparing a frequency of synchronizing signal detection pulse and said second reference frequency to produce a difference signal which represents said second velocity control information.

22. The optical disk recording/reproducing device of claim 18, wherein said address generating means comprises address decoder means for decoding the pre-recorded information signals into said absolute addresses.

* * * * *